US006925345B2

United States Patent
Campbell et al.

(10) Patent No.: US 6,925,345 B2
(45) Date of Patent: Aug. 2, 2005

(54) METHOD AND SYSTEM FOR MANUFACTURE OF INFORMATION HANDLING SYSTEMS FROM AN IMAGE CACHE

(75) Inventors: Jason Travis Campbell, Marble Falls, TX (US); William H. Wong, Austin, TX (US); Gaston M. Barajas, Austin, TX (US); James Van Artsdalen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 10/271,451

(22) Filed: Oct. 16, 2002

(65) Prior Publication Data

US 2004/0078106 A1 Apr. 22, 2004

(Under 37 CFR 1.47)

(51) Int. Cl.[7] .............................................. G06F 19/00
(52) U.S. Cl. ..................... 700/103; 700/97; 717/174; 713/2
(58) Field of Search ........... 700/97, 103; 717/175–176, 717/177–178, 172, 174; 714/6; 707/104.1, 10; 713/1, 2, 100

(56) References Cited

U.S. PATENT DOCUMENTS

| | | | |
|---|---|---|---|
| 6,080,207 A | * | 6/2000 | Kroening et al. ........... 717/172 |
| 6,202,070 B1 | | 3/2001 | Nguyen et al. ............. 707/104 |
| 6,247,128 B1 | | 6/2001 | Fisher et al. ................ 713/100 |
| 6,262,726 B1 | | 7/2001 | Stedman et al. ............ 345/333 |
| 6,298,443 B1 | | 10/2001 | Colligan et al. ............ 713/200 |
| 6,351,850 B1 | * | 2/2002 | van Gilluwe et al. ....... 717/175 |
| 6,385,766 B1 | | 5/2002 | Doran, Jr. et al. ............ 717/11 |
| 6,421,777 B1 | * | 7/2002 | Pierre-Louis et al. .......... 713/2 |
| 6,604,238 B1 | * | 8/2003 | Lim et al. ................... 717/177 |
| 6,615,365 B1 | * | 9/2003 | Jenevein et al. ............... 714/6 |
| 2002/0087227 A1 | * | 7/2002 | Tozawa et al. ............... 700/95 |
| 2002/0108033 A1 | * | 8/2002 | Kroening ....................... 713/1 |

* cited by examiner

*Primary Examiner*—Leo Picard
*Assistant Examiner*—Alexander Kosowski
(74) *Attorney, Agent, or Firm*—Hamilton & Terrile, LLP; Robert W. Holland

(57) ABSTRACT

A method and system for manufacturing information handling systems analyzes orders for information handling system configurations to select one or more configurations for imaging. For instance, frequently ordered configurations or configurations that are time consuming to manufacture are selected for imaging. When an information handling system having a selected configuration is manufactured, an image of the manufactured information handling system is saved in an image cache. Subsequent information handling systems having the selected configuration are manufactured by copying the saved image to the information handling system, thus reducing the time for loading software onto the information handling system.

18 Claims, 5 Drawing Sheets

METHOD AND SYSTEM FOR MANUFACTURE OF INFORMATION HANDLING SYSTEMS FROM AN IMAGE CACHE

BACKGROUND OF THE INVENTION

1. Field of the Invention

The present invention relates to the field of information handling systems, and more particularly to a method and system for manufacture of information handling systems from an image cache of selected information handling system configurations.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One way to manufacture information handling systems with a wide variety of component configurations is to build information handling systems as they are ordered by customers. In a build-to-order manufacturing system, a customer order is built to meet a configuration specified by the customer and, after the order is completed, the information handling system is delivered to the customer to fulfill the order. An advantage of the build-to-order manufacturing system is that a customer is able to order with a great deal of specificity the parts used to configure the customer's information handling system. However, the manufacture of a wide variety of configurations is complex and difficult to manage. For instance, information handling systems with different hardware components often use different software configurations to manage the hardware components. Further, customers may order a variety of different software applications to be loaded on information handling systems, such as different operating system, word processing, spreadsheet and other small business applications.

One difficulty with managing a build-to-order manufacturing process is that the time needed to copy, unzip and configure software applications can be extensive. As the applications load, information handling systems typically copy the configured software onto a storage device, such as a hard drive, so that the applications are ready to run when the information handling system is delivered to the customer. Often, the applications configure onto the hard drive with repeated booting of the information handling system as the applications load drivers and interfaces to operate with hardware components and other software loaded on the information handling system. The time required to configure software is reduced in some cases by bundling commonly-ordered software, such as operating systems and office applications, together into a consolidated single factory install package. However, these bundled images typically do not complete the software order and typically still require operation of the information handling system to complete configuration.

SUMMARY OF THE INVENTION

Therefore a need has arisen for a system and method which analyzes pending orders in a build-to-order information handling system manufacturing system to identify frequently-ordered configurations for imaging.

A further need exists for a system and method which copies images from the identified configurations to load onto subsequently-manufactured information handling systems having the same configuration.

In accordance with the present invention, a system and method for manufacturing information handling systems is provided which substantially reduces the problems and disadvantages associated with previous methods and systems for manufacturing information handling systems. Orders for information handling systems are analyzed to determine imaging priority by configuration. Configurations selected by the analysis of orders are imaged in a cache following the successful build of an information handling system with the configuration. The image cache is then used to build subsequent information handling systems having the selected configurations. The configurations are identified by software and selected hardware parts so that copying of an image results in an accurately configured information handling system having a successful installation of a configuration ordered by a customer.

More specifically, a quick configuration engine interfaces with a software burn rack to provide cached images to information handling systems being manufactured. An order analyzer analyzes pending orders for a selected time period to select one or more configurations for caching. The cached images are obtained from successfully configured information handling systems so that loading a cached image results in an operationally configured information handling system having the same configuration as the system from which the cached image was taken. An image cache service identifies configurations on a software burn rack that are selected for storage in the image cache from a comparison of selected parts with ordered parts. Once a selected configuration is stored as an image, the software burn rack determines if pending orders have configurations that match the configuration of the stored image, and if so, copies the stored image to the pending order. The parts list compares ordered software and selected hardware to determine if the configurations match.

The present invention provides a number of important technical advantages. One example of an important technical advantage is that orders are analyzed to select imaging priority by configuration for a given set of orders. For instance, configurations are identified that will have the same hard drive image after a successful installation of all software and then counted to select the most frequently-ordered configurations for imaging. Alternatively, configuration time is considered in selecting the configurations for imaging so that manufacturing time is reduced over all of the orders without impacting the flexibility of building information handling systems to order.

Another example of an important technical advantage is that images from selected configurations are copied to a cache and available for loading on subsequent information handling systems with the same image without separate design and construction of the images. Since the images are taken from successful installations of configurations, information handling systems that have the images copied to their hard drives are instantly brought to the manufacturing step where the original system ended resulting in highly efficient image generation without separate validation or testing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Manufacture of information handling systems involves the selection from a wide variety of hardware and software configurations. In a build-to-order manufacturing process, information handling systems are manufactured as orders are received and processed so that orders for similar configurations may be dispersed through an order stream. In order to more efficiently manufacture information handling systems having similar configurations, the present invention stores images burnt on frequently-ordered information handling systems and downloads the stored image on subsequent systems with the same configuration. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
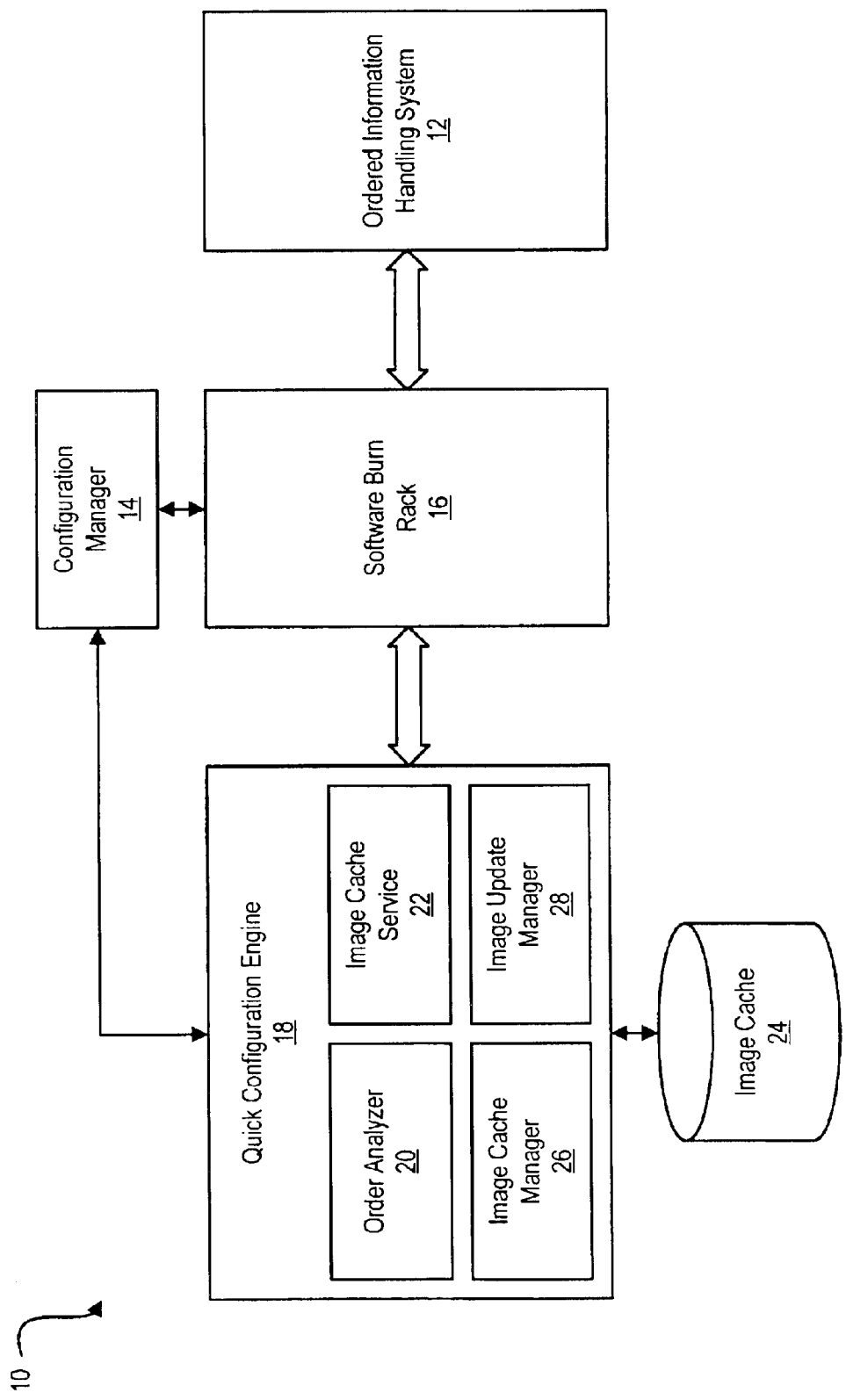
FIG. 1 depicts a block diagram of an imaged cache information handling system manufacturing system.

Referring now to FIG. 1, a block diagram depicts a manufacturing system 10 for building ordered information handling systems 12 to have a configuration desired by the customer who ordered the information handling system. A configuration manager 14 receives customer orders for information handling systems 12 that are designated to be built during a selected time period, such as a day, and manages the manufacture of the information handling systems to have a desired configuration. For instance, physical components are assembled to meet the specifications of a customer order, such as the type and amount of processors, buses, hard drives, disk storage devices, memory, graphics card, networking devices and other physical components. Once configuration manager 14 completes management of the physical manufacture of an information handling system 12, configuration manager 14 manages the configuration of software loaded on information handling system 12. For instance, information handling system 12 is interfaced with a software burn rack 16 and configuration manager 14 manages the loading of the software configuration ordered by the customer onto information handling system 12. Software burn rack 16 is directed to download, unzip and configure ordered software identified by configuration manager 14 to complete configuration of the information handling system.

Software burn rack 16 reduces the time needed for configuring the software of ordered information handling systems 12 by interfacing with quick configuration engine 18 to determine if an image exists that matches an ordered software configuration and, if so, by using the existing image to configure the ordered information handling system. Quick configuration engine 18 includes an order analyzer 20 that obtains the information handling system orders to be built from configuration manager 14 and analyzes the orders to identify a selected number of frequently-ordered configurations for the relevant time period. Order analyzer 20 provides the identified configurations to an image cache service 22 that is in communication with software burn rack 16. If an identified configuration is detected at software burn rack 16, image cache service 22 determines if an image matching the identified configuration is stored in image cache 24. If a copy of the identified configuration is stored as an image in image cache 24, then software burn rack 16 copies the image in image cache 24 to the ordered information handling system 12. If a copy of the identified configuration is not stored as an image in image cache 24, then software burn rack 16 installs the configuration software and image cache service 22 stores an image of the configured software in image cache 24. An image cache manager 26 maintains image cache 24 by removing aged images. Image update manager 28 ensures the currency of stored images by deleting images that include software updated after the storing of the image.

Figure 2:
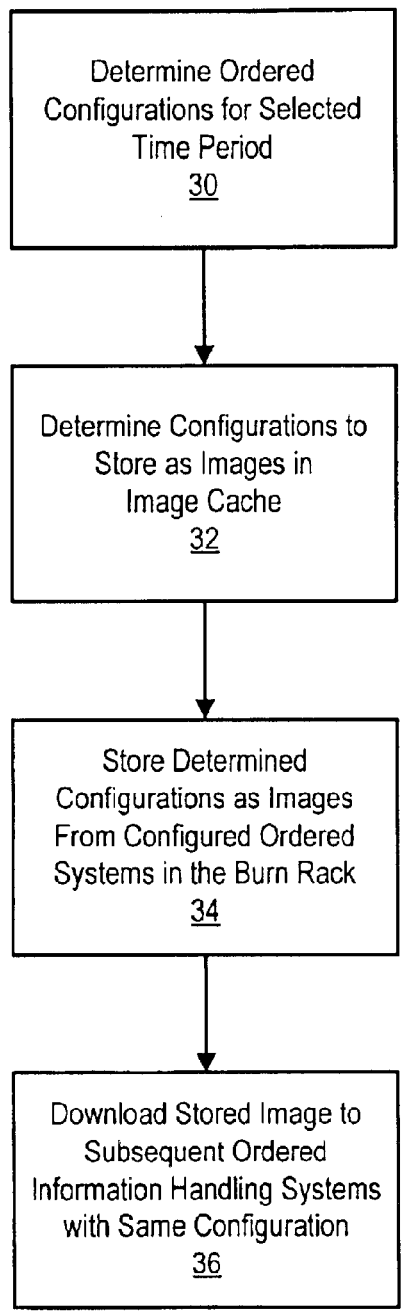
FIG. 2 depicts a flow diagram for manufacturing information handling systems with stored images of selected configurations.

Referring now to FIG. 2, a flow diagram depicts a process for selecting and storing images of configurations for subsequent copying to information handling systems with the same configuration. At step 30, the ordered configurations for a selected time period are identified and counted by the order analyzer 20 based on the orders pending in the configuration manager 14. For instance, at the start of a factory day, the order analyzer 20 downloads the orders for the day and determines the software configurations of the ordered information handling systems 12 by analyzing the software and relevant hardware devices. As an example, configuration of an information handling system with selected software is typically not affected by the size of RAM of the information handling system but may have unique drivers for hardware devices from different suppliers, such as modems or graphics cards. The order analyzer 20 identifies configurations as the software and hardware loaded on the information handling system minus a subset of excludable hardware devices, such as the amount of RAM. The identified configurations are tracked by parsing the orders into lists of relevant parts and storing the lists in a relational database. Alternatively, non-relevant items are pulled from the orders and the configurations are then stored using a hash.

At step 32, the order analyzer 20 determines the configurations to store as images in image cache 24 for subsequent copying to information handling systems 12 having the same configuration. For instance, the most frequently ordered configurations are determined by counting the total number of each configuration pending in configuration manager 14 and storing the configurations that have the greatest total number. Alternatively, more complex analysis may be performed based on a variety of factors including the time for burning each configuration, the time advantage gained by loading a stored image instead of burning the configuration, the storage space available for storing images and the priority of orders relative to each other. The configurations identified for storage as images are provided to the image cache service 22 along with a parts list for each configuration. The image cache service 22 compares the parts list with each order at the software burn rack 16 to identify orders having an image in image cache 24 by comparing the parts list of the identified configurations with the parts list of the system that is set for burning. At step 34, an image of an identified configuration is stored in the image cache 24 from a configured information handling system 12 in the software burn rack 16 the first time the identified configuration is loaded in the software burn rack. Thereafter, at step 34 the stored image is loaded to subsequent information handling systems 12 with the identified configuration. Information handling systems are identified to accept a stored image by comparing the parts list of the order with the parts lists in the image cache service 22 for the stored images.

Figure 3:
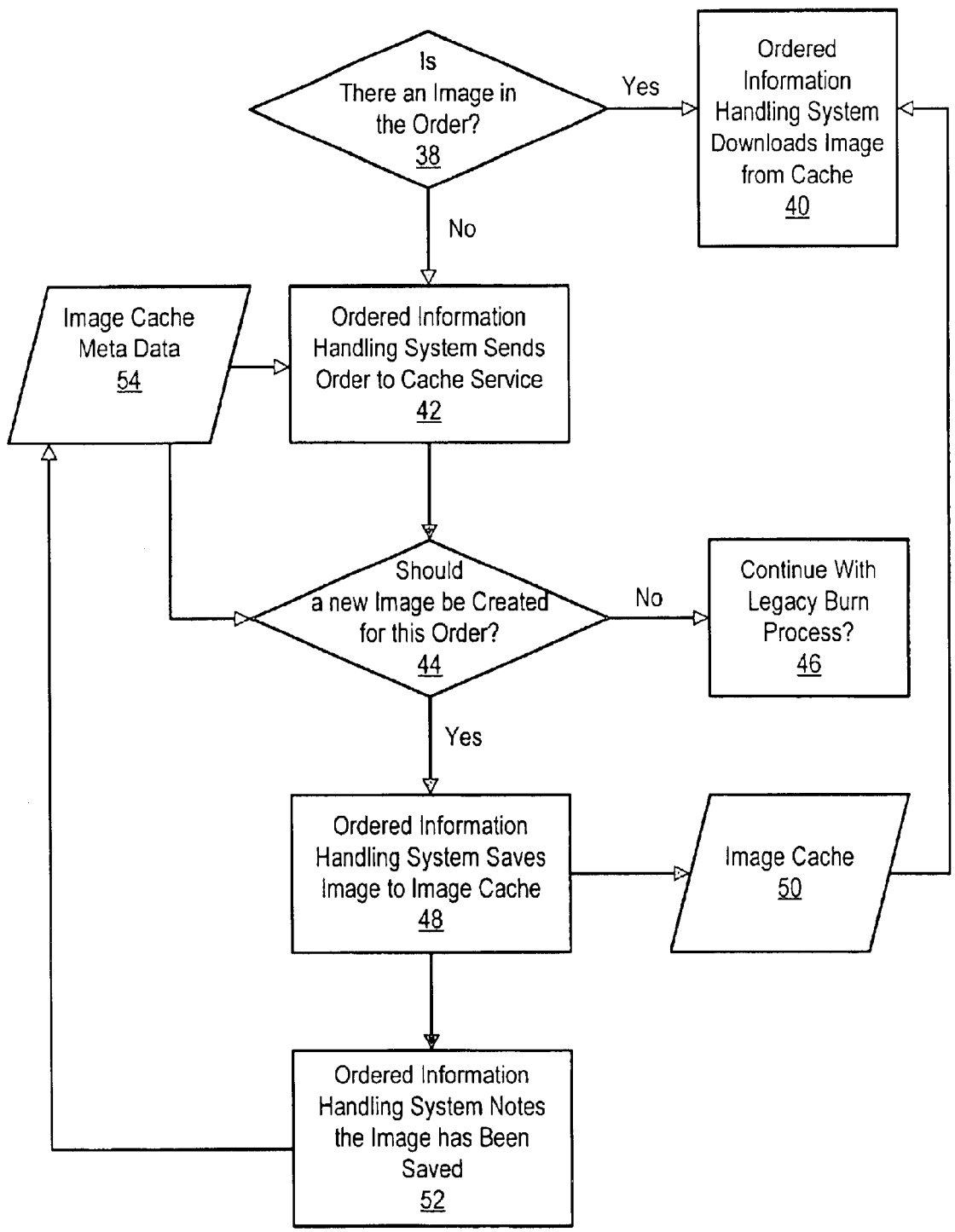
FIG. 3 depicts a flow diagram for storing and loading imaged configurations.

Referring now to FIG. 3, a flow diagram depicts the process of the software burn rack 16 and image cache service 22 for identifying, caching and loading images of frequently ordered information handling system configurations. The process starts at step 38 with a determination of whether a configuration identified for image caching is in an order pending at the software burn rack 16. For instance, the parts list for the pending order is compared against the parts lists for identified configurations to determine if the pending order matches a configuration identified for caching. If an image matching the ordered configuration is available, the process proceeds to step 40 for the ordered information handling system to download the matching image from the image cache 24. To aid in identification of available cached images, the software burn rack 16 maintains image cache meta data that tracks available cached images.

If the image cache meta data fails to identify a stored image matching the configuration of the pending ordered information handling system, the process proceeds to step 42 where the storage burn rack provides the pending order to the image cache service. At step 44, the image cache service determines if the pending order is for a configuration identified for storing as an image. If not, then at step 46 the software burn rack continues with conventional loading of the configuration software. If the determination at step 44 is yes that the ordered configuration is to be stored as an image, the software burn rack loads the configuration on the ordered information handling system 12 which then saves the loaded configuration as an image in the image cache 24 at step 50. At step 52 the ordered information handling system 12 communicates the image cache meta data for the stored image to the software burn rack 16. At step 54, the software burn rack 16 identifies stored images with the image cache meta data which contains manifests of parts for each image currently available for download and for images that need to be created.

Figure 4:
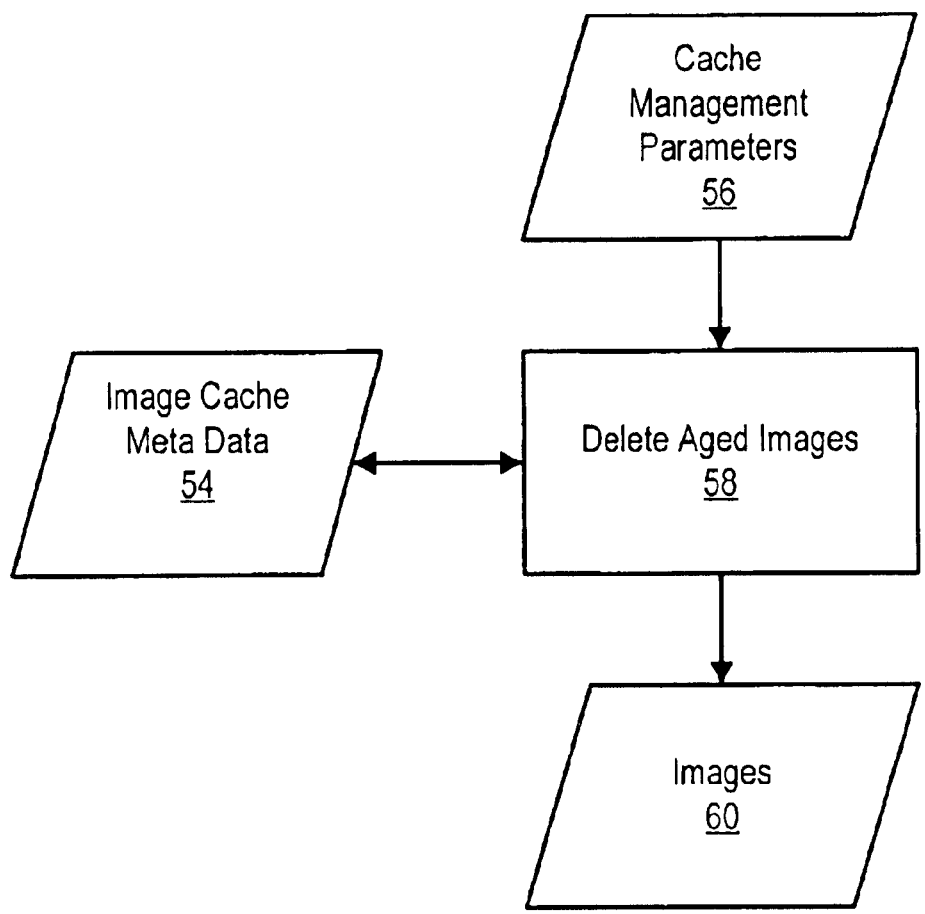
FIG. 4 depicts a flow diagram for managing an image cache.

Referring now to FIG. 4, the process of image cache manager 24 is depicted for maintaining image cache 24 by removing aged images. At step 56, cache management parameters are determined for defining the duration for storing an image. For instance, the passage of a time period of greater than 48 hours without copying of the stored image results in deletion of the image from image cache 24. Alternatively, management parameters may take into account the available memory of image cache 24, the number of stored images, the number of copies made of a stored image and the anticipated number of future copies of a stored image that will be needed. At step 58, image cache manager 24 applies the parameters to image meta data 54 to delete aged images. Image meta data is updated at step 54 to reflect the remaining images at step 60.

Figure 5:
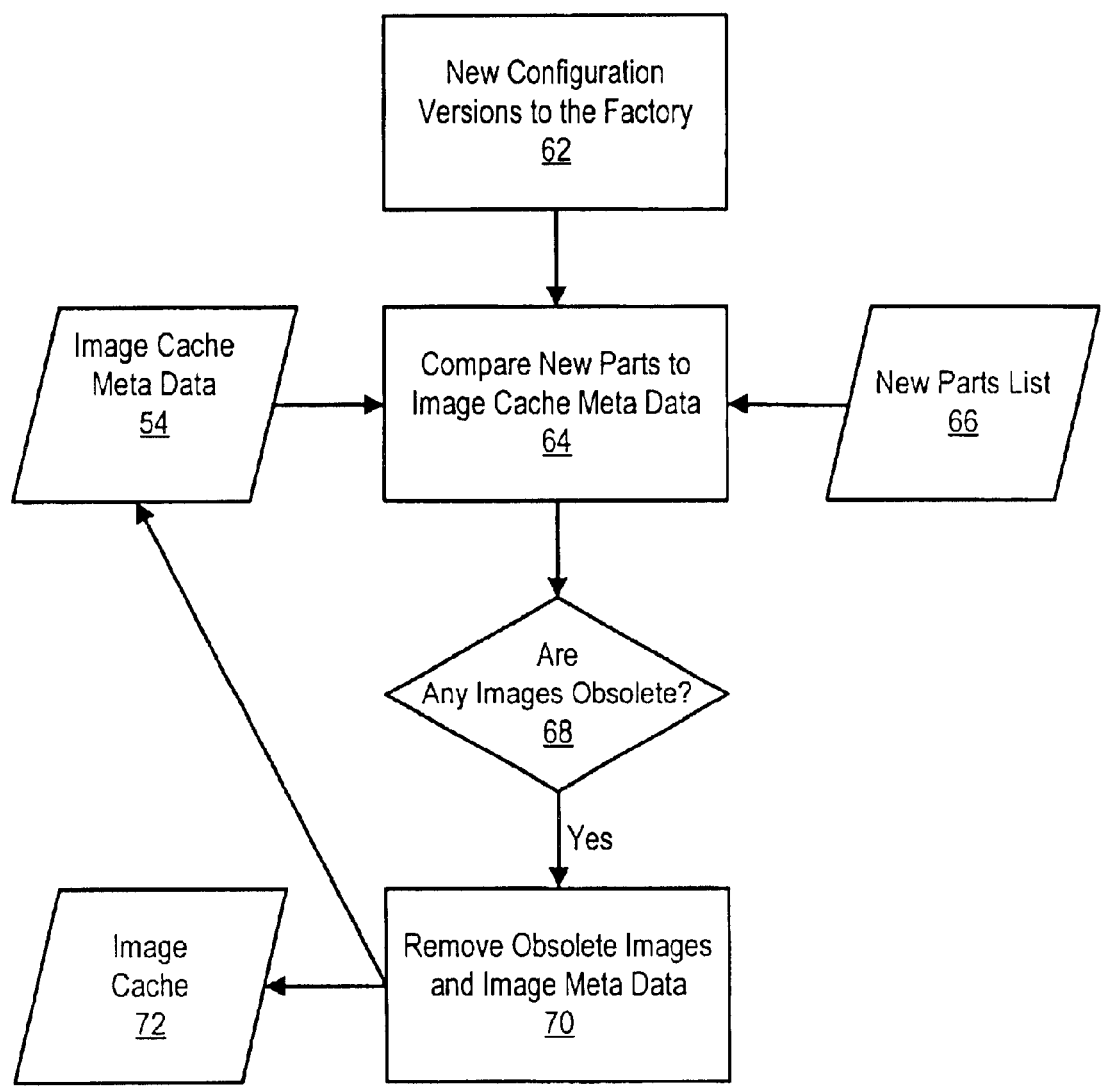
FIG. 5 depicts a flow diagram for updating configuration versions to remove obsolete configuration images.

Referring now to FIG. 5, the process of image update manager 28 is depicted for updating image cache 24 when configurations for the orders change. At step 62, the new configuration versions are provided to configuration manager 14. For example, if a driver for a hardware device is updated, the new driver is identified as a new configuration version. At step 64, a comparison is made between the new parts list 66 and the parts list of the image cache meta data 54 to determine the cached images affected by the new configuration version. At step 68, obsolete images are identified as those that include the parts that were updated. At step 70, the obsolete images are removed from the image cache at step 72 and the image meta data is updated at step 54 to reflect the obsolete images as no longer available.

Although the present invention has been described in detail, it should be understood that various changes, substitutions and alterations can be made hereto without departing from the spirit and scope of the invention as defined by the appended claims.

What is claimed is:

1. A system for manufacturing information handling systems, each information handling system having one of plural configurations, the system comprising:

a configuration manager operable to accept plural information handling system orders, each order defining a configuration for an information handling system;

an order analyzer interfaced with the configuration manager and operable to identify one or more of the information handling system configurations for image caching based on one or more predetermined factors, comprising at least the frequency of orders for configurations;

a software burn rack interfaced with the configuration manager and operable to configure software identified by an order on an information handling system; and an image cache service interfaced with the software burn rack and operable to store an image of an information handling system identified by the order analyzer and configured by the software burn rack.

2. The system of claim 1 further comprising an image cache meta data interfaced with the software burn rack, the image cache meta data listing the configurations for image caching identified by the order analyzer, the software burn rack comparing the order for an information handling system with the image cache meta data to determine if an image is stored for the configuration associated with the order.

3. The system of claim 2 wherein the software burn rack coordinates with the image cache service to store an image of an information handling system if the image cache meta data identifies an order as having an image cache and no image is cached, the image cache service operational to store the image of the order and to update the image cache meta data.

4. The system of claim 1 wherein an information handling system configuration comprises software and selected hardware parts.

5. The system of claim 1 wherein the order analyzer predetermined factors further comprise the time used to burn software for the configurations.

6. The system of claim 1 further comprising an image cache operable to store images of information handling system configurations.

7. The system of claim 6 further comprising an image cache manager operable to maintain the image cache by removing aged images.

8. The system of claim 6 further comprising an image update manager operable to maintain the image cache by removing images made obsolete due to new configuration versions.

9. A method for manufacturing information handling systems, the method comprising:

analyzing orders for information handling systems to identify one or more information handling system configurations for image caching by determining the frequency of orders for the information handling system configurations and identifying more frequently ordered configurations for image caching;

determining that an information handling system at software load has a configuration identified for image caching;

loading the software on the information handling system;

copying an image of the information handling system to an image cache;

determining that a subsequent information handling system order has the identified configuration; and copying the image from the image cache to the subsequent information handling system.

10. The method of claim 9 wherein analyzing orders further comprises determining the time associated with manufacture of the information handling system configurations and identifying configurations for image caching based on the reduction in manufacture time provided by caching selected configuration images.

11. The method of claim 9 wherein determining that an information handling system at software load has a configuration identified for image caching further comprises comparing a parts list from an order for the information handling system with a parts list for information handling system configurations identified for cache imaging.

12. The method of claim 11 wherein the parts list comprises the software and hardware parts from an order minus excludable hardware parts.

13. The method of claim 12 wherein the excludable hardware parts comprise hardware components that do not affect the software loaded on the information handling system.

14. The method of claim 9 wherein determining that a subsequent information handling system order has the identified configuration further comprises comparing the order with an image cache meta data file.

15. The method of claim 9 further comprising maintaining the image cache by removing aged or obsolete images.

16. An image cache for aiding in the manufacture of information handling systems, the image cache comprising:

an image of an information handling system configuration, the configuration selected from plural orders for information handling systems, each of the plural orders having one or plural configurations, the selecting of the configuration based on the frequency of orders for the configuration compared with the frequency for other configurations, the selected image copied from an information handling system manufactured with the selected configuration and operational to copy to an information handling system subsequently built with the selected configuration.

17. The image cache of claim 16 further comprising plural images of information handling system configurations, each of the plural images selected based on the frequency of orders for a configuration associated with the image.

18. The image cache of claim 16 wherein the configuration comprises software and selected hardware parts for the ordered information handling system.

* * * * *